United States Patent [19]

Thomas

[11] 4,417,447
[45] Nov. 29, 1983

[54] COMBINED INTERNAL COMBUSTION AND STEAM ENGINE

[76] Inventor: Luther B. Thomas, 159 Herndon Ave., Shreveport, La. 71101

[21] Appl. No.: 374,271

[22] Filed: May 3, 1982

[51] Int. Cl.³ ............................................. F01B 29/04
[52] U.S. Cl. .................................. 60/712; 123/25 C; 123/276
[58] Field of Search ............ 60/712; 123/25 A, 25 B, 123/25 C, 25 D, 25 P, 276, 293

[56] References Cited

U.S. PATENT DOCUMENTS

| | | | |
|---|---|---|---|
| 3,074,228 | 1/1963 | Lee | 123/25 C X |
| 3,132,633 | 5/1964 | Zimmerman | 123/276 X |
| 3,933,132 | 1/1976 | Kishishita | 123/25 C |
| 4,143,517 | 3/1979 | Kellogg-Smith | 60/712 |
| 4,322,950 | 4/1982 | Jepsen | 60/712 |

Primary Examiner—Allen M. Ostrager
Assistant Examiner—Stephen F. Husar
Attorney, Agent, or Firm—D. Paul Weaver

[57] ABSTRACT

The power of a fuel injected internal combustion engine is augmented by forming in the head of the engine piston or pistons a chamber within which superheated steam is generated from cyclically injected water and which also serves as a pre-combustion space. In a preferred embodiment, the piston head has steam channels extending from said chamber through the top face of the piston.

4 Claims, 4 Drawing Figures

COMBINED INTERNAL COMBUSTION AND STEAM ENGINE

BACKGROUND OF THE INVENTION

U.S. Pat. Nos. 3,959,974 and 4,301,655, issued to Thomas, disclose internal combustion engines whose power is increased and efficiency improved by cyclically injecting water through the cylinder head into the combustion space above the piston, in the case of U.S. Pat. No. 3,959,974; and by injecting water into a steam generating cavity formed in the cylinder head in the case of U.S. Pat. No. 4,301,655.

While both patented structures achieve their stated objectives, both possess some drawbacks in terms of manufacturing costs and operational efficiency, and, accordingly, the object of this invention is to improve on the two prior patented arrangements and the known prior art in general.

The present invention utilizes the head of the engine piston or pistons for the formation of a steam generating chamber instead of utilizing the cylinder head for this purpose, as in U.S. Pat. No. 4,301,655. This has several advantages. A much smaller mass of material requiring heating to produce steam is present in the piston head, as compared to the larger cylinder head. It is feasible to employ high temperature materials in the manufacturing of the pistons which can withstand much higher temperatures than the cylinder head, and this factor, together with the smaller mass of the piston, will significantly shorten the time period required for the fuel saving power augmentation cycle to commence during engine operation, compared to the prior art. It is also less costly to provide what amounts to a miniature steam boiler in the head of the piston than to provide the same in the cylinder head.

A further advantage achieved by the improved structure is that the steam generating chamber formed in each piston can serve simultaneously as a pre-combustion chamber of the kind successfully employed in many compression ignition type engines. This achievement of the invention obviates the necessity for a second and separate fuel injection chamber as in U.S. Pat. No. 4,301,655.

As in U.S. Pat. No. 3,959,974, a displacement piston without rings and not requiring lubrication is used and such a piston can withstand extremely high temperatures when fabricated from known high temperature materials, thus enhancing the efficiency of the engine. As a practical matter, a cylinder head cannot be manufactured to withstand such high temperatures.

Other features and advantages of the invention will become apparent during the course of the following description.

DETAILED DESCRIPTION

Figure 1:
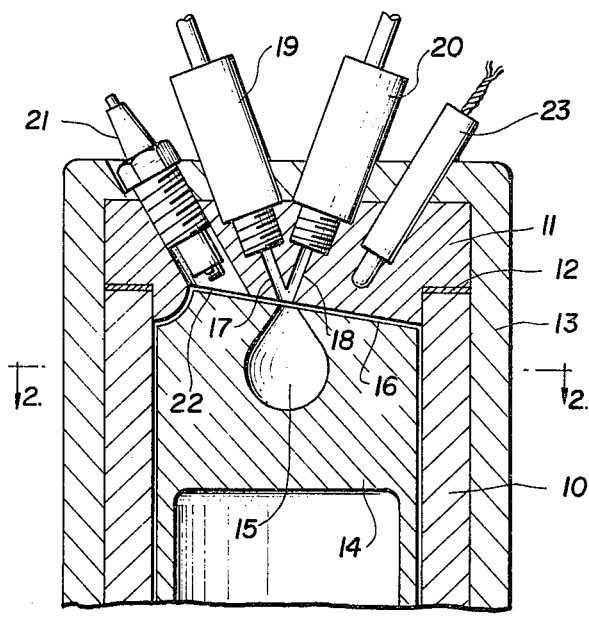
FIG. 1 is a fragmentary vertical section through an engine cylinder whose piston and coacting parts are constructed in accordance with the invention.
Figure 2:
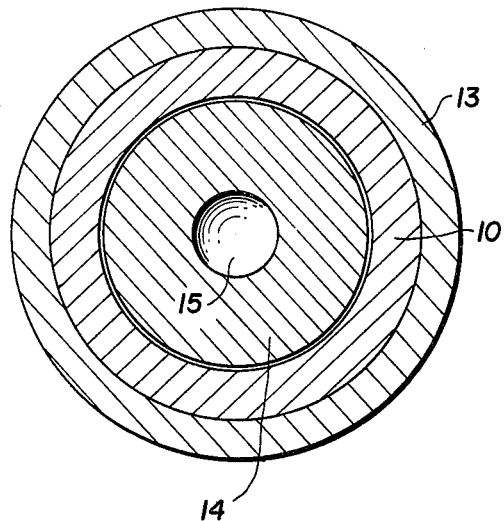
FIG. 2 is a horizontal section taken on line 2—2 of FIG. 1.

Referring to the drawings in detail wherein like numerals designate like parts, a single engine cylinder and piston are shown for simplicity, and it should be understood that the invention can be embodied in engines having various numbers of cylinders in different engine configurations.

In the drawings, an engine cylinder 10 has a cylinder head 11 equipped with a suitable gasket 12 at the end face of the cylinder. Preferably, the cylinder and head are jacketed in thermal insulating material 13. A piston 14 forming an important element of the invention is constructed from state-of-the-art high temperature materials and is of the ringless type requiring no lubrication in accordance with U.S. Pat. No. 3,959,974.

The piston includes a thick head portion, as illustrated, and within this piston head portion is formed a combined steam generating and pre-combustion chamber 15 which preferably tapers toward the adjacent piston end face 16 centrally of the piston. The relatively narrow mouth of the chamber 15 communicates with two convergent passages 17 and 18 formed in the cylinder head 11 through which droplets of water at proper times from a water injector 19 and liquid fuel from an injector device 20 are delivered into the piston chamber 15.

A spark plug or glow plug 21 secured within the cylinder head 11 has its ignition tip in communication with the main cylinder combustion space 22 at the top of the piston. The injector devices 19 and 20 are state-of-the-art equipment.

A conventional heat sensor 23 is embedded in the cylinder head 11 to sense the temperature of the latter during engine operation. When the temperature increases sufficiently, the heat sensor acts through conventional controls, not shown, to turn on the water injector 19 to cyclically inject water into the piston head chamber 15. The operation is basically as described in U.S. Pat. No. 4,301,655 except that the steam generating chamber is in the high temperature piston head and not in the cylinder head. As previously explained, the chamber 15 of the invention also serves the second purpose of a pre-combustion chamber and has fuel injected into it by the injector 20 without the necessity for a second injection chamber, as in the prior patent.

In terms of results achieved, the change-over during engine operation to the fuel-saving power augmenting steam boosted mode occurs more quickly than in the prior art. Superheated steam will be produced substantially instantly in the chamber 15 to boost engine power while saving fuel and improving overall engine efficiency.

Figure 3:
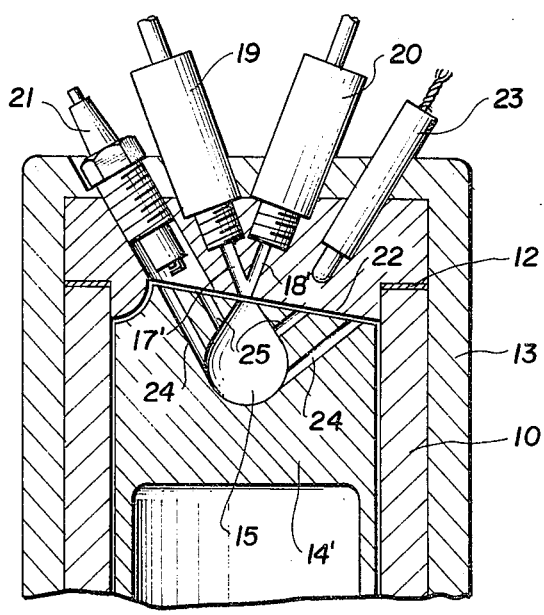
FIG. 3 is a cross section similar to FIG. 1 showing a preferred embodiment.
Figure 4:
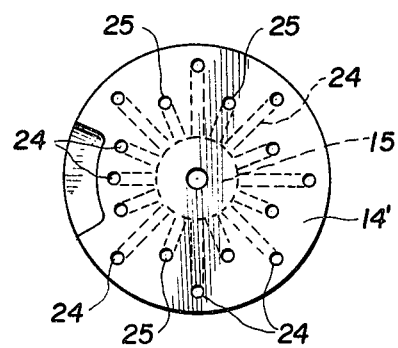
FIG. 4 is an elevational view showing the end face of the piston in FIG. 3.

FIGS. 3 and 4 show an embodiment which is preferred and which differs from the first embodiment only in that the piston 14' is further equipped with a multiplicity of radiating channels or passages 24 and 25 which lead from the dual purpose chamber 15 through the piston end face to the main combustion space 22. When superheated steam is generated in the chamber 15, it can reach the combustion space 22 more quickly when the passages 24 and 25 are used, and therefore engine efficiency is further increased.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. A combined internal combustion and steam engine of the injected type comprising a cylinder including a cylinder head and cylinder chamber, a ringless piston formed of high temperature resisting material operably mounted in the cylinder chamber and having an end face opposing a surface of the cylinder head whereby a combustion space is formed between the piston end face and the cylinder head opposing surface, the piston having an axially thick piston head rearwardly of said end face and having formed therein centrally and axially a single bulbous axially forwardly tapering piston head chamber including a constricted mouth opening through said end face centrally thereof, a multiplicity of circumferentially and radially spaced inclined axis narrow passages leading outwardly from said single piston head chamber and opening through said end face and being widely distributed in spaced relationship over the piston end face, separate fuel and water injection means on the cylinder head centrally and having convergent axes and having outlets which open through said surface of the cylinder head substantially in intersecting relationship and in registration with the constricted mouth of the tapering piston head chamber, an igniter and heat sensor means on the piston head with at least the igniter means communicating with said combustion space between the piston end face and the opposing cylinder head surface.

2. A combined internal combustion and steam engine of the injected type as defined in claim 1, and said single piston head chamber being spherically formed at its end rearwardly of the piston end face and being conically tapered toward said end face and constricted mouth, said multiplicity of inclined axis narrow passages being arranged in two circumferentially intervening groups and the passages of one group being shorter than those of the other group and opening through said end face on a circle whose diameter is smaller than the diameter of a second circle on which the passages of the other group open through said end face.

3. A combined internal combustion and steam engine of the injected type as defined in claim 2, and said piston end face and cylinder head opposing surface comprising flat parallel surfaces.

4. A combined internal combustion and steam engine of the injected type comprising a cylinder including a cylinder head and cylinder chamber, a ringless piston formed of high temperature resisting material operably mounted in the cylinder chamber and having an end face opposing a surface of the cylinder head whereby a combustion space is formed between the piston end face and the cylinder head opposing surface, the piston having an axially thick piston head rearwardly of said end face and having formed therein centrally and axially a single bulbous axially forwardly tapering piston head chamber including a constricted mouth opening through said end face centrally, said bulbous chamber being spherically rounded at its end away from said end face and being conically tapered toward said end face so as to terminate at the end face in said restricted mouth, separate fuel and water injection devices on the cylinder head and having convergent axes and outlets which open through the opposing surface of the cylinder head in intersecting relationship and in registration with the constricted mouth of the tapering piston head chamber, the intersecting outlets of the fuel and water injection devices forming an aperture in said opposing surface of the cylinder head which is substantially equal in size to the size of the constricted mouth of the piston head chamber, and separate igniter and heat sensor devices on the piston head with at least the igniter device communicating with said combustion space.

* * * * *